United States Patent [19]

Burch

[11] Patent Number: 5,895,004
[45] Date of Patent: Apr. 20, 1999

[54] COIL WINDING APPARATUS FOR LARGE DIAMETER MAGNETIC RINGS

[75] Inventor: Jerry C. Burch, Northridge, Calif.

[73] Assignee: Labinal Components & Systems, Inc., Lombard, Ill.

[21] Appl. No.: 09/055,789

[22] Filed: Apr. 6, 1998

Related U.S. Application Data

[60] Provisional application No. 60/042,791, Apr. 7, 1997.

[51] Int. Cl.$^6$ ............................................ H02K 15/085
[52] U.S. Cl. ........................ 242/432.3; 242/432.4; 242/432.6; 29/736
[58] Field of Search ........................ 242/432, 432.1, 242/432.2, 432.3, 432.4, 432.5, 432.6, 433.4; 29/596, 732, 736

[56] References Cited

U.S. PATENT DOCUMENTS

| | | | |
|---|---|---|---|
| 2,632,602 | 3/1953 | Weis | 242/1 |
| 2,998,937 | 9/1961 | Potter et al. | 242/1.1 |
| 3,323,734 | 6/1967 | Peters | 242/1.1 |
| 3,334,825 | 8/1967 | Friedrich | 242/1.1 |
| 3,338,526 | 8/1967 | Shaff et al. | 242/432.4 |
| 3,411,725 | 11/1968 | Biddison | 242/432.5 |
| 3,493,186 | 2/1970 | Arick | 242/1.1 |
| 3,524,600 | 8/1970 | Peters | 242/1.1 |
| 3,539,121 | 11/1970 | Peters | 242/1.1 |
| 3,629,925 | 12/1971 | Brown, Jr. et al. | 29/205 D |
| 3,753,282 | 8/1973 | Wiehl | 29/205 D |
| 3,822,830 | 7/1974 | Peters | 242/432.5 |
| 3,841,133 | 10/1974 | Rice, Jr. | 72/168 |
| 3,856,221 | 12/1974 | Arick et al. | 242/1.1 R |
| 3,903,593 | 9/1975 | Mason | 29/596 |
| 3,903,933 | 9/1975 | Arick et al. | 140/92.1 |
| 3,913,373 | 10/1975 | Kindig | 72/355 |
| 3,985,163 | 10/1976 | Vogel et al. | 140/92.1 |
| 3,985,164 | 10/1976 | Grawcock | 140/92.1 |
| 4,033,385 | 7/1977 | Taube | 140/92.1 |
| 4,051,595 | 10/1977 | Bale | 29/596 |
| 4,053,111 | 10/1977 | Eminger | 242/432.5 |
| 4,106,189 | 8/1978 | Peters | 29/736 |
| 4,199,115 | 4/1980 | Lachey | 242/432.6 |
| 4,290,190 | 9/1981 | Arnold | 29/596 |
| 4,724,604 | 2/1988 | Kawazoe et al. | 29/606 |
| 4,765,551 | 8/1988 | Page et al. | 242/433.4 |
| 4,834,305 | 5/1989 | Ruben et al. | 242/433.2 |
| 4,844,356 | 7/1989 | Koizumi et al. | 242/432.5 |
| 4,880,173 | 11/1989 | Lachey | 242/1.1 R |
| 5,056,212 | 10/1991 | Scherer | 29/564.5 |
| 5,090,107 | 2/1992 | Beakes et al. | 29/566.3 |
| 5,090,108 | 2/1992 | Banner et al. | 29/596 |
| 5,113,573 | 5/1992 | Taji et al. | 29/596 |
| 5,134,769 | 8/1992 | Scherer | 29/596 |
| 5,186,405 | 2/1993 | Beakes et al. | 242/1.1 R |
| 5,235,738 | 8/1993 | Eminger | 29/736 |
| 5,291,649 | 3/1994 | Lombardi et al. | 29/596 |
| 5,316,227 | 5/1994 | Oohashi et al. | 242/7.03 |
| 5,383,618 | 1/1995 | Santandrea et al. | 242/1.1 R |
| 5,528,822 | 6/1996 | Ponzio et al. | 29/736 |
| 5,549,253 | 8/1996 | Beakes et al. | 242/432.3 |
| 5,596,796 | 1/1997 | Ruoss | 29/596 |
| 5,732,900 | 3/1998 | Burch | 242/432.5 |

*Primary Examiner*—Donald P. Walsh
*Assistant Examiner*—Robert J. Wolf
*Attorney, Agent, or Firm*—Biebel & French

[57] ABSTRACT

An apparatus for winding wire onto a magnetic ring structure defining slots for receiving wire coils formed thereon. The apparatus includes a mounting structure for holding the ring structure and a platform supported within the peripheral area defined by the ring structure, the platform supporting a wire feed mechanism and a wire forming mechanism. A guide member is supported on an end of the platform adjacent to the ring structure and includes a face plate which is spring biased into engagement with the ring structure to thereby prevent wire from slipping out of the slots in the ring structure as the coils are wound. The guide member, along with the platform carrying the wire feed mechanism and wire forming mechanism, is mounted for rotational movement about a rotational axis, and is further supported for movement in horizontal and vertical directions, perpendicular and parallel to the rotational axis, respectively.

23 Claims, 7 Drawing Sheets

COIL WINDING APPARATUS FOR LARGE DIAMETER MAGNETIC RINGS

PRIOR PROVISIONAL APPLICATION

Applicant claims the benefit of the filing date of Provisional application Ser. No. 60/042,791, filed Apr. 7, 1997.

BACKGROUND OF THE INVENTION

The present invention relates to apparatus for winding coils on magnetic ring structures and, more particularly, to an apparatus for winding coils on large diameter magnetic ring structures.

Large diameter magnetic ring structures are used as components in large stators, armatures and magnetic field generators, such as is employed in CAT scanners and similar magnetic imaging equipment. The ring includes slots formed radially therein wherein the slots are wound with coils of wires. The coil winding pattern, that is, the direction of winding and the number of slots included in each coil, is determined by the intended function of the ring structure.

In prior art coil winding operations, wire is first wound into coils of the proper diameter and is then inserted by hand into designated slots in the ring. With this winding technique, the coils must be made relatively large, that is, with excess wire, in order for them to be inserted into the slots. However, the excess wire is unnecessary for proper magnetic operation of the ring structure, and the excess wire further adds to the weight and expense of the completed ring structure.

In order to reduce the amount of wire wound in slots of prior art small diameter ring structures, various apparatus have been proposed for directly winding the wire into the slots, and thereby reduce the requirement that excess wire be provided for the coils. However, such prior art devices are generally incorporated in a winding spindle of a relatively small size for positioning within a small magnetic ring structure, such as a motor stator. Such winding spindles cannot be conveniently incorporated in a winding operation for large diameter magnetic ring structures wherein the ring structures have diameters spanning many feet. The winding parameters for any winding apparatus used on a large diameter ring structure will differ significantly from the requirements for winding smaller ring structures such as small stators. For example, large diameter ring structures include a substantially greater number of slots for receiving the coil wire such that a winding device for winding the coils must be capable of traversing a large circumferential distance while also providing precisely controlled smaller movements at a high speed for winding the wire into the slots to form coils.

SUMMARY OF THE INVENTION

In the present invention, an apparatus is provided for winding wire directly into the slots of a large diameter magnetic ring structure with a minimum of excess wire. Magnet wire is pushed into the slots, and the wire is directed from slot to slot under computer control of several drivers or drive motors. The size and mass of the components of the wire winding mechanism that must be moved quickly and repeatedly during the coil winding operation is minimized to permit high speed winding wherein the position of all components is controlled precisely, regardless of the size of the ring structure to be wound.

The apparatus in accordance with the present invention includes a mounting structure or frame for holding a ring structure defining wire receiving slots. A platform is supported for rotating movement about a rotational axis positioned at a location corresponding to a central axis of the ring structure. A guide member is supported on the platform and includes a wire aperture for guiding wire into the slots of the ring structure. A first actuator is provided for moving the platform in substantially linear movement perpendicular to the rotational axis whereby the wire aperture is moved in a horizontal direction between slots on the ring structure for receiving the wire.

The guide member includes a backing plate rigidly supported on the platform and a face plate supported on the backing plate and positioned between the backing plate and the ring structure. The face plate is resiliently movable relative to the backing plate whereby the face plate is biased toward engagement with the inner surface of the ring structure. In addition, the engaging surface of the face plate is formed with an arcuate contour to conform to the arcuate shape of the ring structure. A wire driver is supported on the platform for pushing wire through the wire aperture in the guide member. The wire driver includes a stepping motor precisely controlling a feed mechanism for pushing wire at a controlled rate toward the slots of the ring structure.

A further or second actuator is provided for moving the platform in substantially linear movement parallel to the rotational axis. The two actuators for moving the platform provide precise movement of the wire aperture relative to the ring structure slots whereby the wire aperture is moved in a generally rectangular pattern to guide wire vertically through the slots and horizontally between the slots to form the wire coils on the ring structure.

A wire former is also provided supported on the platform and extending through the guide member. The wire former includes a first or upper member and a second or lower member located above and below the wire aperture. A wire former driver, comprising a motor driving an eccentric connected to the wire former, drives the wire former to an extended position where the upper and lower members are extended from the guide member to bias coils on the ring structure outwardly and thereby facilitate the formation of compact coils through the operation of the present apparatus.

Therefore, it is an object of the present invention to provide a wire winding mechanism for winding large diameter magnetic ring structures with a minimum of excess wire.

It is another object of the invention to provide such a wire winding mechanism wherein the size and mass of the components of the mechanism is minimized to permit high speed winding.

It is a further object of the invention to provided a wire winding mechanism which provides precise control of the position of the components to ensure precise placement of the wire in the slots of a ring structure.

Other objects and advantages of the invention will be apparent from the following description, the accompanying drawings and the appended claims.

DETAILED DESCRIPTION OF THE PREFERRED EMBODIMENT

Figure 1:
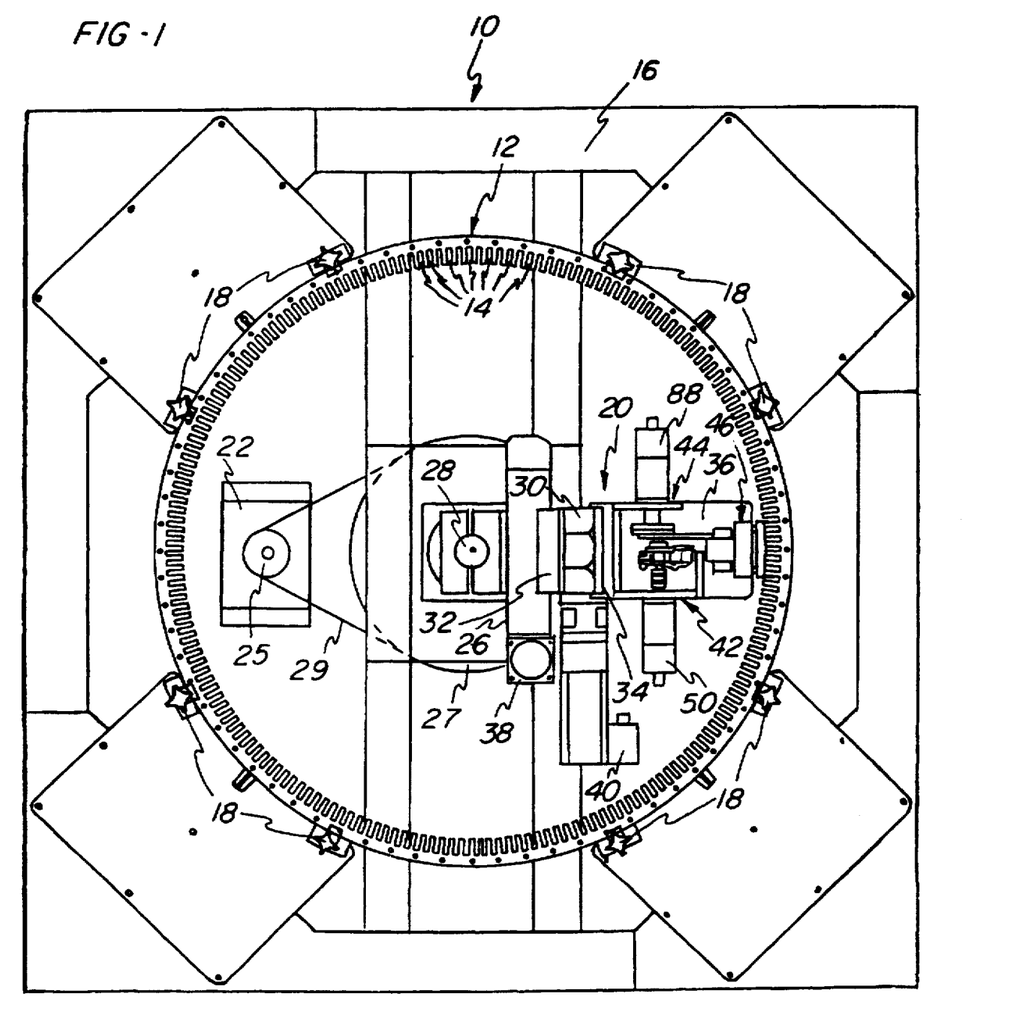
FIG. 1 is a plan view of the apparatus of the present invention set up to wind wire onto a magnetic ring structure.

Referring initially to FIG. 1, the apparatus 10 of the present invention comprises a device for winding wire coils onto a magnetic ring structure 12 wherein the magnetic ring structure 12 includes a plurality of slots 14 for receiving the wire coils formed thereon. The apparatus 10 generally includes a support frame 16 defining a mounting structure and including a plurality of clamps 18 for holding the ring structure 12. The apparatus 10 further includes a coil winding and forming mechanism 20 located within the peripheral area circumscribed by the mounting structure supporting the ring 12.

The coil winding and forming mechanism 20 includes a central driver or motor 22 supported on the frame 16, and which is preferably a servo motor. The motor 22 is operably connected to an output shaft 28 through a toothed belt 29 engaged around a pulley 25 on the motor 22 and around a pulley 27 on the shaft 28. The motor 22 drives the winding and forming mechanism 20 in rotational movement about a rotational axis 24 (FIG. 2) of the shaft 28 in precisely controlled angular amounts thereby to position the mechanism 20 with respect to the magnetic ring structure 12.

Figure 2:
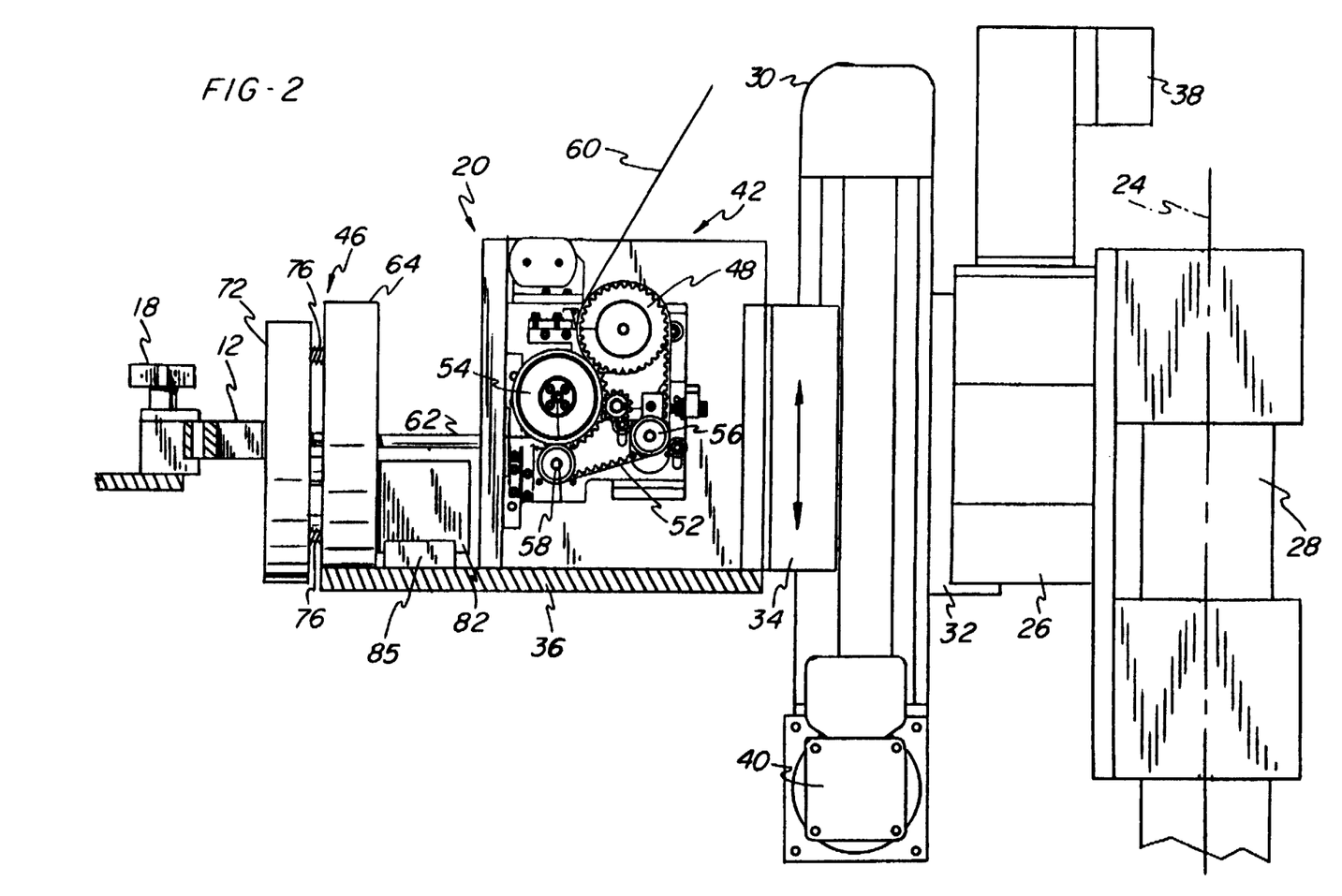
FIG. 2 is a side elevational view showing details of the guide member and wire drive mechanism.

A first or horizontal actuator 26 is supported on the output shaft 28, and a second or vertical actuator 30 is mounted on a sliding carriage 32 of the horizontal actuator 26. The vertical actuator 30 includes a vertically sliding carriage 34 supporting a platform 36 (FIG. 2). The horizontal and vertical actuators 26, 30 are powered by respective stepping motors 38, 40, and in the preferred embodiment, comprise slide belt drive tables, model number 506004PD-ES-D4-L3-C2-M1-W1, sold by Parker Hannifin Corporation, Daedal Division of Harrison City, Pa.

The platform 36 supports a wire feed mechanism 42 for feeding wire onto the ring structure 12, and a wire former mechanism 44 for forming the coils located in the slots 14 of the ring structure 12 to thereby facilitate compact formation of the coils. In addition, a guide member 46 is supported on the platform 36 between the wire feed mechanism 42 and the ring structure 12 for facilitating guiding of the wire toward the ring structure 12 and for maintaining the wire in the slots 14 as the coils are being formed.

Referring to FIG. 2, the wire feed mechanism 42 includes a sprocket wheel 48 powered by a wire feeding motor 50 (FIG. 1) wherein the sprocket wheel 48 drives a toothed belt 52 along a path around a wire feed drum 54 and pulleys 56 and 58. The drum 54 is preferably provided with a centrally located circumferential slot into which magnet wire 60 is guided from above the coil winding apparatus 42 in order to keep it in alignment with the drum while the belt forces or pushes the wire out of the wire feed mechanism 42 and through a guide tube 62.

Figure 3:
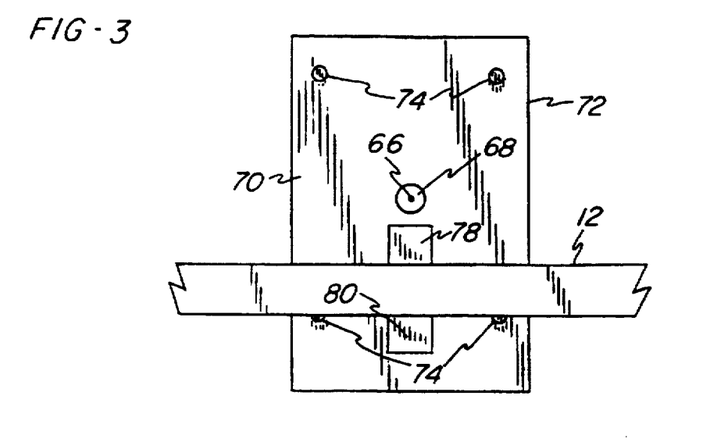
FIG. 3 is a front elevational view of the face plate of the apparatus positioned adjacent to a magnetic ring structure.

The guide tube 62 forms part of the guide member 46 and directs the wire through a backing plate 64 of the guide member 46 and to an aperture 66 defined in a wire guide needle 68 inserted in the front face 70 of a face plate 72 (see also FIG. 3). The face plate 72 is moveably supported on the backing plate 64 by four bolts 74 rigidly engaged with the backing plate 64 and slidably engaged with the face plate 72. The face plate 72 is biased away from the backing plate 64 by compression springs 76 positioned over the bolts 74 and extending between the face plate 72 and backing plate 64.

It should be noted that the front surface 70 of the face plate 72 is formed with an arcuate surface for matching the curvature of the inner surface of the ring structure 12, such that the face plate circumscribes a section of the peripheral area of the ring structure 12. In addition, the face plate 72 is formed with a sufficient height and width to remain in contact over the slots 14 of the ring structure 12 receiving wire for a coil throughout the travel of the wire guide needle 68 during the formation of the coils whereby the face plate 72 prevents the wire from slipping out of the slots 14 as the coils are wound.

Figure 4:
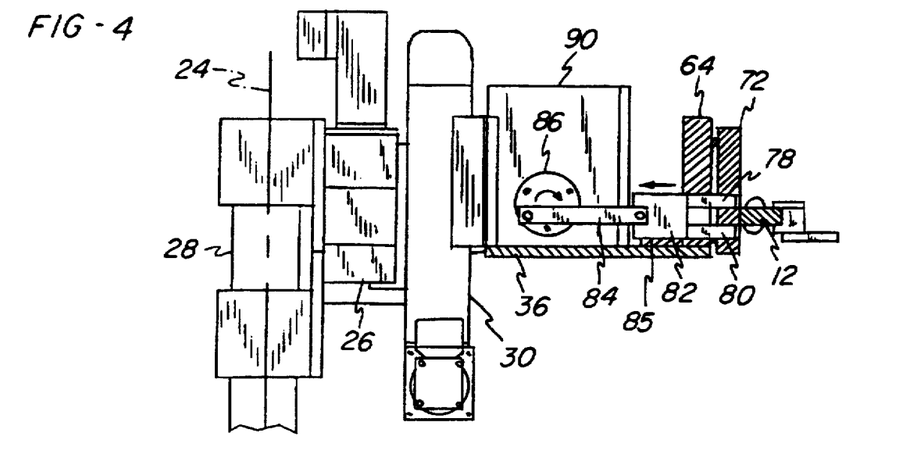
FIGS. 4 and 5 are side elevational views showing different positions for the wire former of the present invention.
Figure 5:
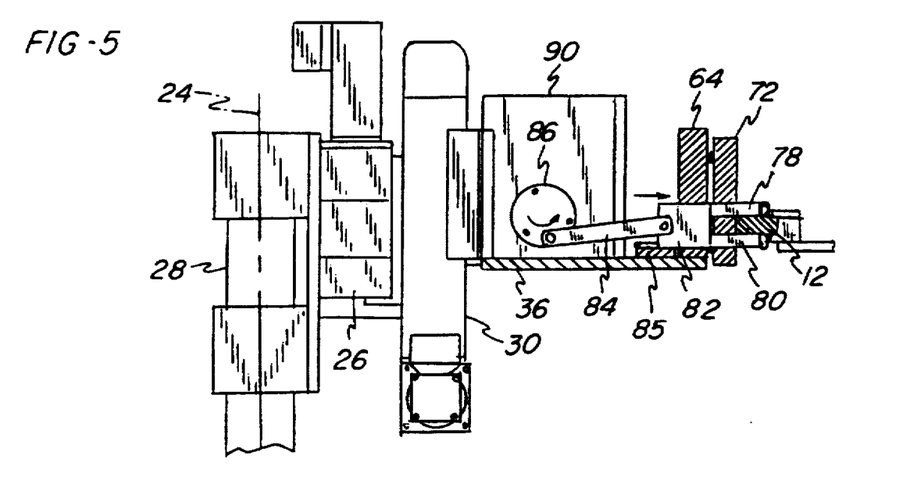

Referring to FIGS. 4 and 5, the wire former mechanism 44 includes a first or upper wire forming member 78 and a second or lower wire forming member 80 wherein the wire forming members 78, 80 extend radially outwardly from a connecting block 82 through the backing plate 64 and face plate 72, and include front faces or engaging portions for engaging and pushing coils within the slots 14. As may be further seen in FIG. 3, the forming members 78, 80 extend through apertures in the face plate 72 at locations below the wire guide needle 68, and are spaced apart a distance at least as great as the height of the ring structure 12.

A connecting rod 84 includes opposing ends connected to the connecting block 82 and to an eccentric drive wheel 86. The connecting block 82 is supported for movement on the platform 36 by the backing plate 64 and by a guide bearing 85, and the wheel 86 is driven in rotating movement by a stepping motor 88 (FIG. 1) supported on a vertical plate 90 extending upwardly from the platform 36. Rotation of the drive wheel 86 in a counterclockwise direction, as seen in FIG. 5, causes the forming members 78, 80 to extend outwardly past the front face 70 of the face plate 72 and into contact with a wire coil wound in the slots 14 whereby the coil undergoes a forming operation compacting the coil to permit additional wire to be wound into the slots. The forming members 78, 80 are retracted back into the face plate 72 in response to rotational movement of the drive wheel 86 in a clockwise direction, as seen in FIG. 4, which is the normal position of the forming members 78, 80 as wire is fed from the wire guide needle 68 during a winding operation.

Figure 6:
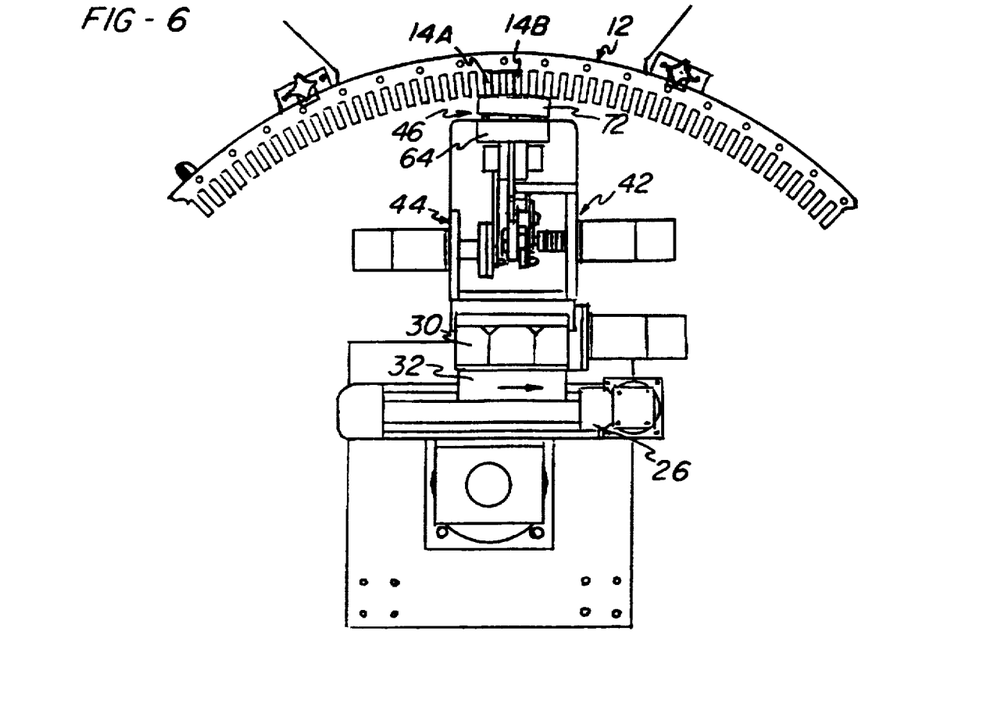
FIGS. 6 and 7 are top plan views illustrating the horizontal movement of the platform of the apparatus.
Figure 7:
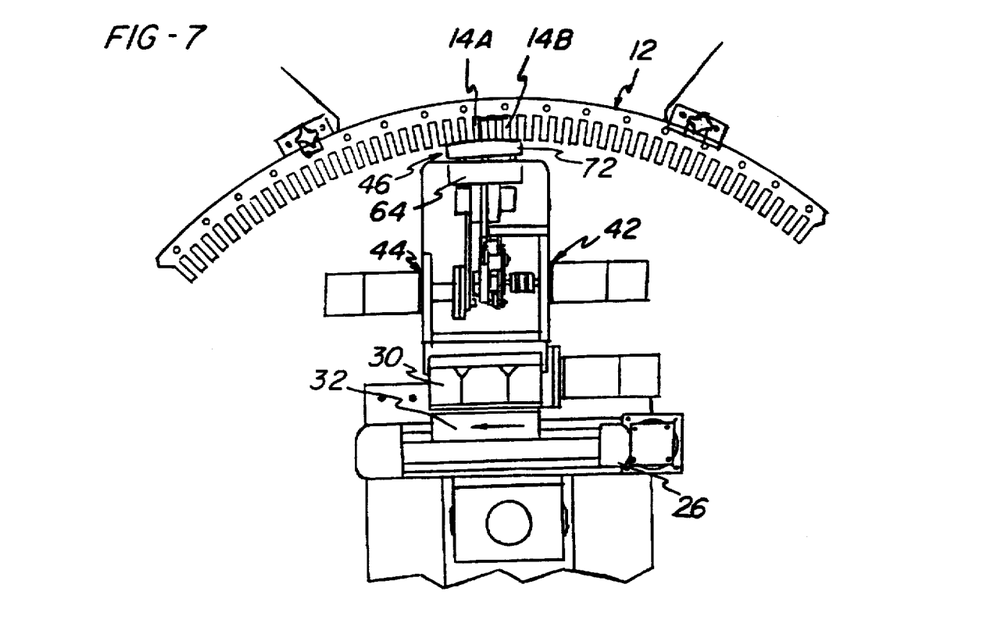

Referring to FIGS. 6 and 7, the horizontal movement of the guide member 46 relative to the ring structure 12 is illustrated. As seen in FIG. 6, the horizontal actuator 26 actuates the guide member and horizontal movement to the right from alignment with a slot 14A into alignment with a slot 14B, the coil being formed extending between the slots 14A and 14B. As can be seen, the springs 76 permit the face plate 72 to rock slightly relative to the plane defined by a front face of the backing plate 64 whereby the front surface of the face plate 72 is permitted to remain in constant engagement with the inner surface of the ring structure 12.

FIG. 7 illustrates movement of the guide member 46 in the opposite direction to the left whereby the guide structure 46 is moved back into alignment with the slot 14A. The springs 76 permit the face plate 72 to rock in an opposite direction and thereby maintain the face plate 72 in constant contact with the inner surface of the ring structure 12.

Figure 8:
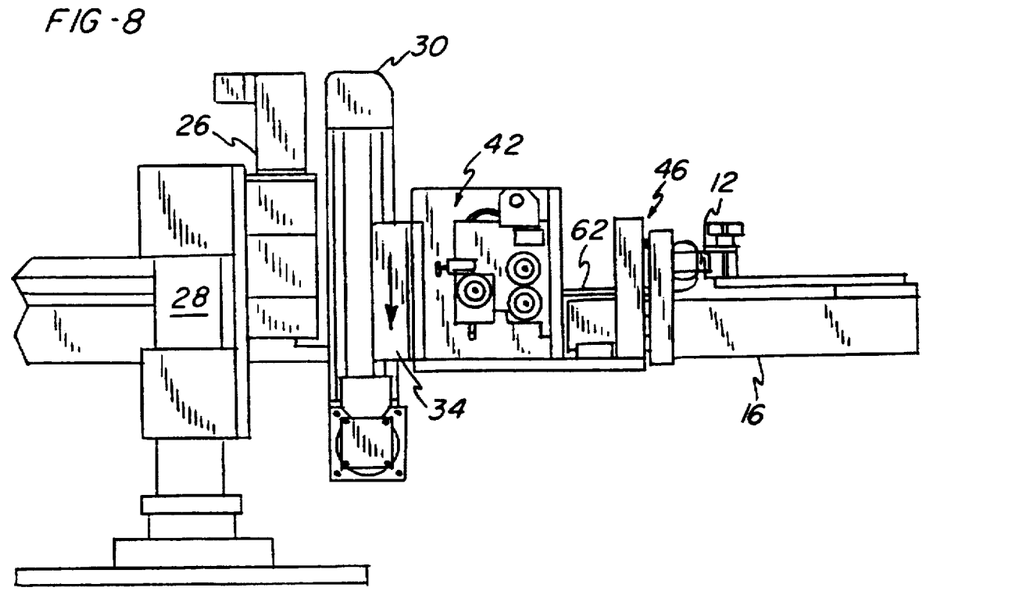
FIGS. 8 and 9 are side elevational views illustrating the vertical movement of the platform of the apparatus.
Figure 9:
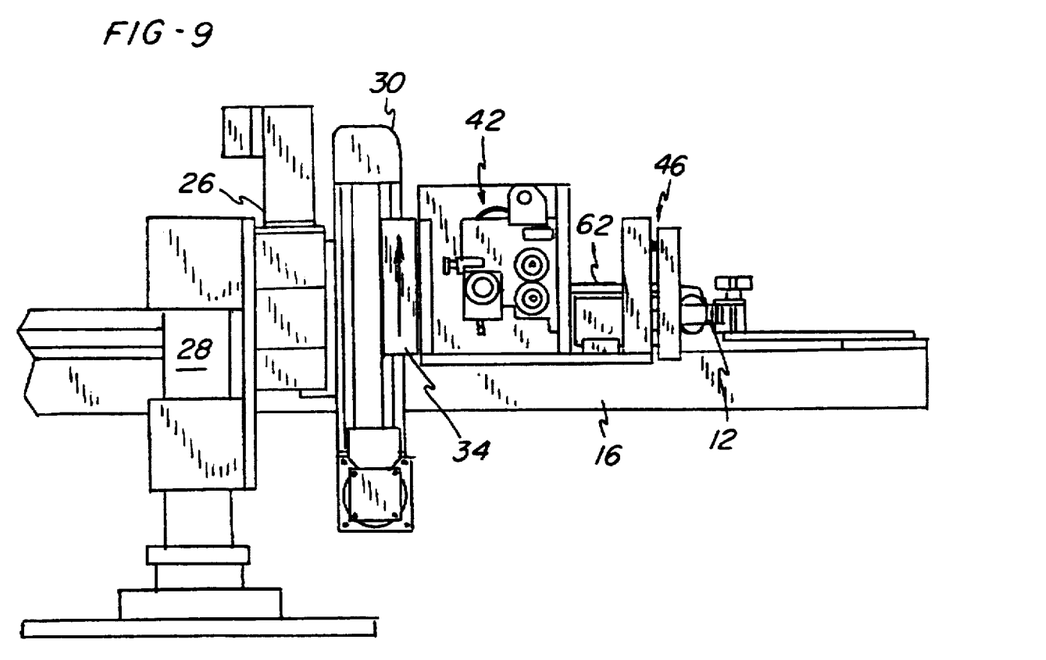

FIGS. 8 and 9 illustrate the vertical movement of the guide member 46 controlled by the vertical actuator 30. FIG. 8 illustrates the position of the guide member 46 at the conclusion of downward movement of the platform 36 to guide wire into one of the slots 14, and FIG. 9 illustrates the position of the guide member 46 after upward movement of the platform 36 for inserting the wire through a different one of the slots 14. For example, the downward movement of the guide member 46 shown in FIG. 8 may correspond to placement of the wire in slot 14B, and the vertical upward movement illustrated in FIG. 9 may correspond to insertion of wire through the slot 14A, with the horizontal movements illustrated in FIGS. 6 and 7 occurring alternately with the movements illustrated in FIGS. 8 and 9.

Figure 10:
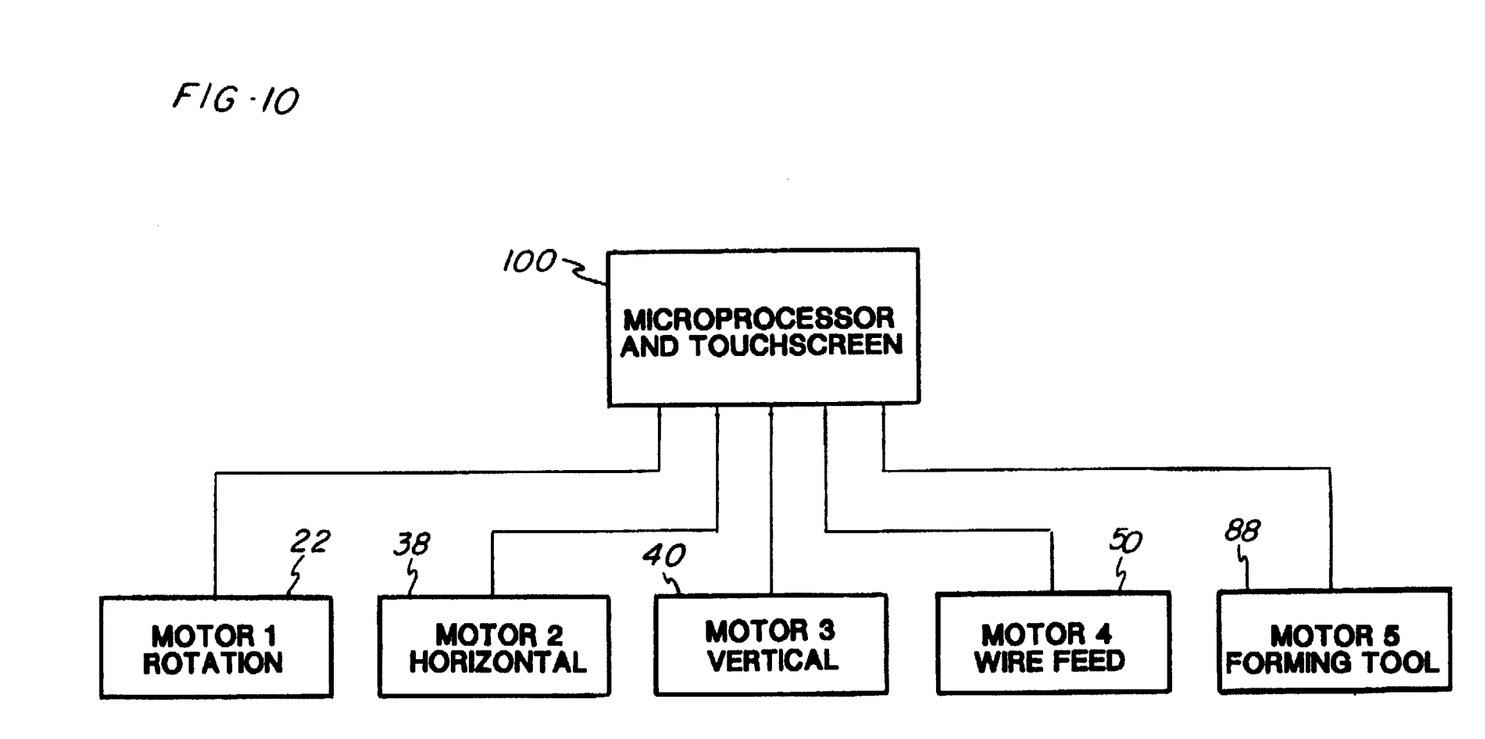
FIG. 10 is a simplified electrical block diagram of the control circuit for the various motors used in the present invention.

Referring to FIG. 10, a simplified electrical block diagram is illustrated showing the basic elements for controlling the coil winding apparatus 10. A microprocessor 100 controls the operation of the several motors that are a part of the present invention, described as motor 1 for the stepping motor 22 controlling rotation about the axis 24, motor 2 for the stepping motor 38 controlling movement in the horizontal direction, motor 3 for stepping motor 40 controlling movement in the vertical direction, motor 4 for stepping motor 50 controlling the wire feed and motor 5 for stepping motor 88 controlling movement of the forming tool. Also included with the microprocessor 100 is a touchscreen for controlling and monitoring the winding and forming parameters of the apparatus 10.

Figure 11:
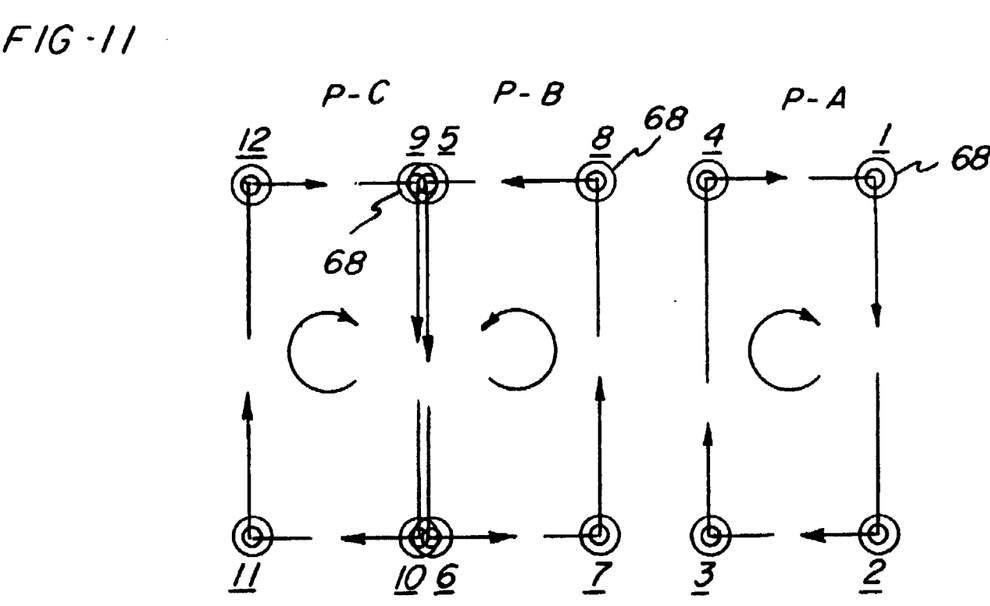
FIG. 11 is a schematic representation of a coil winding operation.
Figure 12:
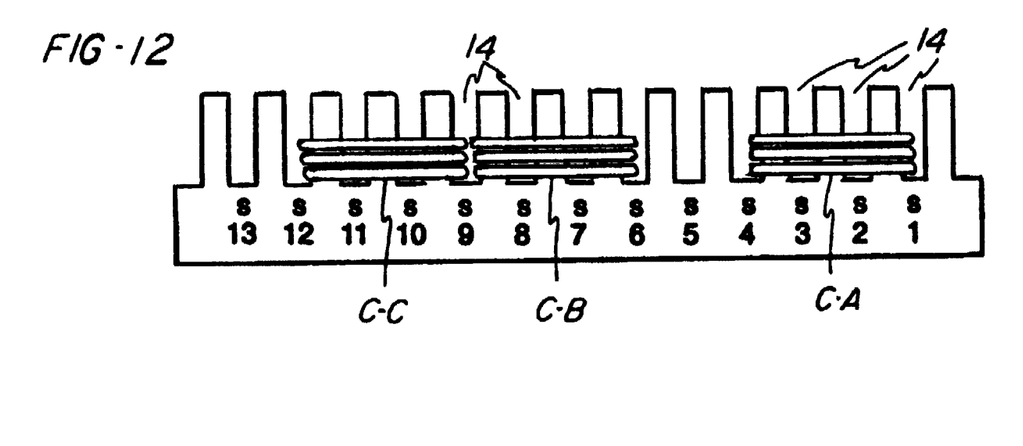
FIG. 12 is a plan view of a portion of a ring structure with coils wound thereon in accordance with the operation represented in FIG. 11.

Turning now to FIGS. 11 and 12, the sequence of operation for winding coils onto the ring structure 12 will be described. In FIG. 11, the wire guide needle 68 is represented in three different horizontal positions relative to the slots 14 and the ring structure 12, as defined by different rotational positions for the vertical shaft 28 controlled by the stepping motor 22 wherein the different positions are identified as P-A, P-B and P-C.

In this particular example, three coils will be wound: the first coil C-A will be wound clockwise in slots S1 and S4, the second coil C-B will be wound counterclockwise in slots S6 and S9, and the third coil C-C will be wound clockwise in slots S9 and S12. To wind the first coil, the wire guide needle 68 is positioned in alignment with the slot S1 by rotating the vertical shaft 28 to a location where the wire guide needle 68 would normally be aligned centrally between the two slots S1 and S4 for receiving the coil C-A, and actuating the horizontal actuator to position the needle 68 horizontally in alignment with the slot S1, and the vertical actuator 30 is energized to move the needle 68 to its upper most position 1 (FIG. 9). The wire feeding motor 50 is energized to push the wire out of the wire guide needle 68 into the slot S1 while the vertical actuator 30 is energized to move the wire guide needle 68 downwardly. When the needle 68 reaches its downwardmost position 2 (FIG. 8), the horizontal actuator 26 is energized and the needle 68 is moved horizontally to the position 3 (FIG. 6).

The vertical actuator 30 is then actuated to move the needle 68 upwardly while the wire is pushed into the slot S4 until the needle 68 reaches its uppermost position 4; at this time the horizontal actuator is again energized, this time in the reverse direction, to move the needle 68 to position 1 (FIG. 7).

After a predetermined number of windings are made, the microprocessor 100 will stop the winding operation and will energize the vertical actuator 30 to position the forming members 78, 80 above and below the ring structure 12. The stepping motor 88 is then energized to extend the forming members 78, 80 radially outwardly toward the ring structure 12 and thereby push the windings back into the slots (see FIG. 5) to thereby provide further space for additional windings in the slots.

When the coil C-A is completed, the microprocessor 100 will cause the stepping motor 22 to be energized whereby the guide member 46 will be rotated to the position P-B where coil C-B will be wound in slots S6 and S9. It should be understood that some wire will be fed by the wire feed mechanism 42 during the transition from one coil to another. Since the coil C-B is wound in the counterclockwise direction, the wire guide needle 68 will be positioned at position 5, opposite slot S9, then the sequence of operation will begin with the vertical actuator 30 being energized to move the needle 68 downwardly while the wire feed mechanism 42 pushes wire outwardly into the slot S9. When the needle 68 reaches position 6, the horizontal actuator 26 will be energized to move the needle 68 to position 7, opposite slot S6, and the vertical actuator 30 will again be energized to move the wire guide needle 68 upwardly for feeding wire into slot S6.

When the winding needle 68 reaches position 8, the needle 68 will be moved to position 5 by energizing the horizontal actuator 26 wherein the process will be repeated until the desired number of windings are made. When the coil C-B is completed, the stepping motor 22 will be energized to again rotate the guide member 46 until it is aligned with position P-C for winding of a new coil C-C in slots S9 and S12.

The new coil C-C is wound in a clockwise pattern moving through positions 9, 10, 11 and 12 in sequence. The process is the same as that described above for the other coils. It should be noted that the speed at which the wire feed mechanism 42 feeds the wire into the slots is controlled to position the wire at desired locations within the slots in order to provide for an even distribution of the windings within the slots, as well as to control the amount of wire placed in the slots to avoid the use of excess wire to form the coils.

It should be understood that during the formation of each coil, the face plate 72 acts to close off the open end of the slots 14 and thereby ensures that the wire forming the coils remains within the slots throughout the winding operation. Further, the face plate 72 is operable to maintain contact with the inside surface of the ring structure 12 throughout positioning and operation of the forming members 78, 80 whereby the wire forming the coils does not have an opportunity to shift out of the slots prior to the forming operation.

In view of the above description of the invention, it should be apparent that the present apparatus 10 operates to provide for efficient coil winding of large diameter magnetic ring structures. In particular, the present apparatus incorporates a winding structure mounted for rotation about a rotational axis whereby the winding structure may be moved to any desired location about a large diameter ring structure. Further, the apparatus provides for smaller degrees of movement in the horizontal and vertical directions, perpendicular and parallel to the rotational axis, respectively, whereby a wire guide member may be precisely positioned in alignment with the slots of the ring structure for precise placement of wire within the slots. In addition, by placing the wire feed mechanism and wire forming mechanism on a common platform with the guide member, an efficient wire winding operation may be performed wherein the quantity of wire provided may be precisely controlled and the formation of the wire within the slots may be efficiently performed.

It should also be noted that by providing a microprocessor controlled operation for controlling the various stepping motors, any desired winding pattern may be provided on the ring structure, without requiring alterations in the physical structure of the apparatus, thereby reducing set up time and providing improved control over the winding operation.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. An apparatus for winding wire coils onto a magnetic ring structure defining slots for receiving wire coils formed thereon, said apparatus comprising:

a mounting structure for holding a ring structure defining wire receiving slots;

a platform supported for rotating movement about a rotational axis;

a guide member supported on said platform;

a wire aperture defined through said guide member for guiding wire into slots in a ring structure supported in said mounting structure; and an actuator for moving said platform in substantially linear movement perpendicular to said rotational axis.

2. The apparatus of claim 1 including a wire former for pushing wires positioned in slots of a ring structure radially outwardly, said wire former extending through and movable relative to said guide member.

3. The apparatus of claim 2 including a wire former driver mounted to said platform for driving said wire former in radial movement relative to said rotational axis.

4. The apparatus of claim 1 wherein said guide member comprises a face plate having an arcuate face surface facing radially outwardly.

5. The apparatus of claim 4 wherein said guide member further comprises a backing plate supporting said face plate wherein said face plate is supported for movement in a radial direction relative to said backing plate.

6. The apparatus of claim 5 including at least one resilient member biasing said face plate away from said backing plate.

7. The apparatus of claim 1 including a wire driver supported on said platform for pushing wire through said wire aperture in said guide member.

8. The apparatus of claim 1 including a second actuator for moving said platform in substantially linear movement parallel to said rotational axis.

9. The apparatus of claim 1 wherein said mounting structure circumscribes a peripheral area and said platform is located for movement within said peripheral area.

10. An apparatus for winding wire coils onto a magnetic ring structure defining slots for receiving wire coils formed thereon, said apparatus comprising:

a mounting structure for holding a ring structure defining wire receiving slots, said mounting structure defining a peripheral area;

a platform supported for movement relative to said mounting structure;

a guide member supported on said platform;

said guide member including a face plate circumscribing a section of said peripheral area;

a wire aperture defined through said face plate for guiding wire into slots in a ring structure supported in said mounting structure; and a wire former supported on said platform for movement toward and away from said mounting structure, said wire former including an engaging portion for engaging and pushing wires positioned in slots of a ring structure supported in said mounting structure.

11. The apparatus of claim 10 wherein said wire former extends through and is movable relative to said face plate.

12. The apparatus of claim 10 including a wire former driver mounted to said platform for actuating said wire former in said movement toward and away from said mounting structure.

13. The apparatus of claim 12 wherein said wire former driver comprises a motor driving an eccentric connected to said wire former.

14. The apparatus of claim 10 wherein said guide member includes a backing plate supporting said face plate wherein said face plate is supported for movement relative to said backing plate.

15. The apparatus of claim 14 wherein said guide member includes a resilient biasing means for biasing said face plate away from said backing plate.

16. The apparatus of claim 10 including a wire driver supported on said platform for pushing wire through said face plate.

17. The apparatus of claim 10 including a pivotal actuator for actuating said platform in pivotal movement about a rotational axis.

18. The apparatus of claim 17 including an actuator for actuating said platform in substantially linear movement parallel to said rotational axis.

19. The apparatus of claim 18 including an actuator for actuating said platform in substantially linear movement perpendicular to said rotational axis.

20. An apparatus for winding wire coils onto a magnetic ring structure defining slots for receiving wire coils formed thereon, said apparatus comprising:

a mounting structure for holding a ring structure defining wire receiving slots;

a guide member supported for movement relative to said mounting structure;

a wire aperture defined through said guide member for guiding wire into slots in a ring structure supported in said mounting structure wherein movement of said guide member positions said wire aperture in alignment with the slots in the ring structure; and wherein said guide member includes a face plate which is resiliently biased toward engagement with a ring structure supported in said mounting structure.

21. The apparatus of claim 20 wherein said guide member is supported for rotating movement about a rotational axis whereby said guide member is guided for movement within a peripheral area circumscribed by said mounting structure.

22. The apparatus of claim 20 wherein said mounting structure circumscribes a circular peripheral area defining a plane and said guide member is supported for substantially linear movement in a direction parallel to said plane.

23. The apparatus of claim 22 wherein said guide member is supported for substantially linear movement in a direction perpendicular to said plane.

* * * * *